United States Patent [19]
Schneiter et al.

[11] B  3,985,076

[45] Oct. 12, 1976

[54] GAS GENERATOR

[75] Inventors: Fred E. Schneiter, North Ogden;
Arnold R. Thompson, Brigham City;
Leland E. Davis, Brigham City;
George F. Kirchoff, Jr., Brigham City, all of Utah

[73] Assignee: Thiokol Corporation, Newtown, Pa.

[22] Filed: Nov. 19, 1973

[21] Appl. No.: 417,349

[44] Published under the second Trial Voluntary Protest Program on March 9, 1976 as document No. B 417,349.

[52] U.S. Cl. .................. 102/39; 23/281; 280/729
[51] Int. Cl.$^2$ .................................. F42B 3/04
[58] Field of Search ............... 102/39; 23/281; 280/150 AB

[56] References Cited
UNITED STATES PATENTS

| | | |
|---|---|---|
| 2,921,521 | 1/1960 | La Haye et al. .................. 102/39 |
| 3,663,035 | 5/1972 | Norton ........................... 102/39 X |
| 3,690,695 | 9/1972 | Jones, Sr. ........................ 102/39 |
| 3,715,131 | 2/1973 | Hurley ........................ 280/150 AB |
| 3,723,205 | 3/1973 | Scheffee ........................... 149/19 |
| 3,733,180 | 5/1973 | Heineck et al. ............... 280/150 AB |
| 3,741,585 | 6/1973 | Hendrickson et al. ....... 280/150 AB |
| 3,771,959 | 11/1973 | Fletcher et al. .................. 23/281 X |
| 3,773,351 | 11/1973 | Catanzarite ...................... 102/39 |
| 3,827,715 | 8/1974 | Lynch .......................... 102/39 X |

OTHER PUBLICATIONS

"The Tinsmith's Helper and Pattern Book," Williams copyright 1917, U.P.C. Book Company, pp. 193–198.

*Primary Examiner*—Stephen C. Bentley
*Assistant Examiner*—Harold Tudor
*Attorney, Agent, or Firm*—Stanley A. Marcus; Edward E. McCullough

[57] ABSTRACT

An electric squib igniter and a gas generant composition surrounding it are enclosed in a hermetically sealed container. This is enclosed in an inner housing which is surrounded by an annular outer housing. An annular filter surrounds the gas generant composition inside the container, which is rupturable through orifices in the inner housing by gases produced when the gas generant composition is ignited. A cooling device in the annular chamber between the two housings is positioned between the orifices of the inner housing and peripheral orifices in the outer housing, through which the filtered, cooled gases may be expelled radially into an inflatable structure. A mounting flange fixed to the outer housing is provided for attachment to related apparatus.

4 Claims, 1 Drawing Figure

U.S. Patent  Oct. 12, 1976  3,985,076
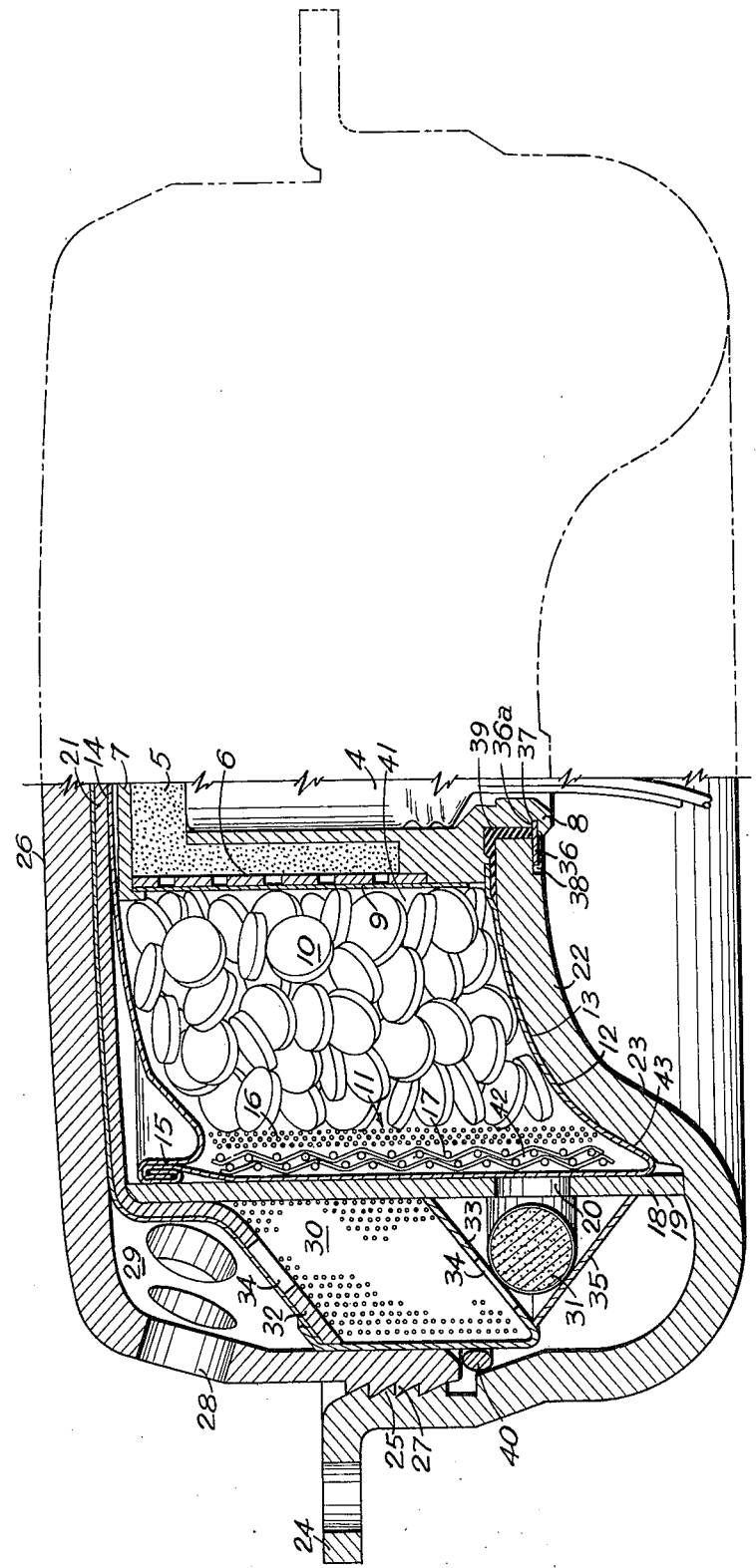

GAS GENERATOR

REFERENCE TO RELATED APPLICATIONS

This invention is related to another patent application titled "Gas Generator" by F. E. Schneiter et al, Ser. No. 47,788, filed June 19, 1970, now U.S. Pat. No. 3,692,495.

BACKGROUND OF THE INVENTION

This invention relates broadly to gas generators; and particularly to solid fuel gas generators suitable for rapidly filling inflatable structures in the presence of humans.

Of particular interest in the present invention is its use for inflating safety cushions in passenger carrying vehicles. Such cushions are designed to be inflated rapidly and automatically to protect human occupants in the event of a collision of the vehicle with some other object.

Solid fuel gas generators for this purpose are known in the prior art. For example, U.S. Pat. No. 2,779,281 to Maurice et al; U.S. Pat. No. 3,305,319 to Kowalick et al; U.S. Pat. No. 3,515,518 to Halstead et al; and U.S. Pat. No. 3,558,285 to Ciccone et al all teach gas generators using a solid gas generant material. However, all of these inventions are characterized by linear, sequential arrangements of the igniter, solid fuel, filtering means, and cooling means in cylindrical housings. Such structures have certain disadvantages in that they tend to be bulky, slow in response time, and tend to deliver damaging jets of gas to the structure to be inflated.

SUMMARY OF THE INVENTION

The present invention, which overcomes these disadvantages of prior art devices, is a basically annular construction for a gas generator. A central ignition means is surrounded by a gas generant composition, and both are enclosed by a hermetically sealed, rupturable container having an annular filter between the gas generant composition and the walls of the container. An inner housing having peripheral orifices surrounds the container, and an outer housing forming an annular chamber surrounding the inner housing also has peripheral orifices. A cooling device is positioned in this annular chamber between the two sets of orifices, and an optional material for pH neutralization of gases is included between the orifices of the inner housing and the cooling device. A mounting flange is fixed to the outer housing for mounting the gas generator to related apparatus.

When the ignition means ignites the gas generant material, the resulting gases rupture the container adjacent the orifices of the inner housing. Solid particles that may be contained in the gases are removed by the filter. The gases then pass through the pH neutralizing material and the cooling device before being expelled into an inflatable structure.

Two important properties that must be inherent in a gas generator for inflating safety cushions for automotive vehicles are: (1) it must inflate the cushion very rapidly (within 35 milliseconds); and (2) the gases produced must be cool enough so that there is no danger of burning the occupants of the automobile. These properties are ordinarily mutually exclusive; because gas generants that burn rapidly usually burn with high temperatures. Prior-art gas generators have relied on rapidly burning gas generants coupled with elaborate means for cooling the gases. Various chemical and mechanical cooling means of the prior art, however, have been found to be either unreliable after long periods of storage or unacceptably bulky. In the present invention, both cooling and speed of reaction are promoted by the mechanical design of the gas generator. As a result, a cooler-burning gas generant may be used and still deliver gases to the inflatable structure within the required time. The speed of reaction is enhanced by the fact that the gas generant material surrounds the ignition means; so that a greater proportion of the gas generant material is directly exposed to hot gases and flame therefrom. Also, both cooling and speed are enhanced by the fact that the gases from the gas generator expand rapidly in all directions rather than linearly through a cylinder.

In addition to speeding the production and delivery of gases so that a coolerburning gas generant may be used, other valuable and unexpected properties that result from this annular design are: (1) the gases produced are automatically diffuse and not concentrated into jets that may damage an inflatable structure; (2) the annular expulsion of gases from the gas generator insures that the gas generator will not be propulsive and function as a rocket inside an automobile in the event of a collision; (3) the filter and cooling means can be made easily, inexpensive, and simply by annular wrappings of wire screen--which may be easily adjusted in size by adding or subtracting wrappings; and (4) there is greater immediate exposure of all gases to the filtering and cooling means, since there is a very large, annular, filtering area.

Objects of the invention are to provide a gas generator suitable for inflating structures in the presence of humans that has a very rapid response and that may deliver gases sufficiently cool that there is no danger of burning human occupants of a vehicle. Important features of the invention are that it is nonpropulsive; the gases are automatically diffuse and cannot damage the inflatable structure; the solid fuel is hermetically sealed and, hence, reliable after years of storage; and filtering and cooling means may be made easily and inexpensively by annular wrappings of screen material in the gas generator. Also, the annular design is very adaptable to the steering column of an automobile, and the structure is simple and easy to manufacture.

DESCRIPTION OF THE DRAWING

The FIGURE is a sectional view through the center of the circular gas generator.

DESCRIPTION OF THE PREFERRED EMBODIMENTS

A conventional electric squib 4 is surrounded by pyrotechnic material 5 in a perforated enclosure having the form of a cylinder 6 with an end cap 7. The squib 4 is supported in a mounting adapter 8. Although any one of a number of pyrotechnic materials may be used, a preferred material is a granular mixture of 25% by weight of boron and 75% of potassium nitrate. A rupturable diaphragm 9 surrounds the perforated cylinder 6. This diaphragm 9 is in turn surrounded by the gas generant material 10, which is surrounded by an annular filter 11. The diaphragm 9 serves the dual purpose of retaining the granular pyrotechnic material 5 in the perforated cylinder 6 and of insuring that the gases produced by the pyrotechnic material have sufficient pressure to permeate the gas generant thoroughly for efficient ignition before they are released by rupture of the diaphragm 9. Although the gas generant 10 may be any one of a number of compositions meeting the requirements for burning rate, nontoxicity, and flame temperature, a preferred material is pellets of a mixture by weight of 55% sodium azide ($NaN_3$) and 45% anhydrous chromic chloride ($CrCl_3$).

This entire assemblage is enclosed in a hermetically sealed, rupturable container 12. The container 12 is preferably made of aluminum and comprises a drawn, cup shaped member 13 sealed to an end disk 14 with a double-crimp seal 15, typical of metal containers used for preserving food and drinks.

The filter 11 is preferably made in two parts, a plurality of layers of fine screen 16 (about 30 to 60 mesh) surrounded by a plurality of layers of coarse screen 17 (about 8 to 16 mesh). The fine screen 16 filters any solid particles out of the gases, and the coarse screen 17 creates a plenum chamber between the fine screen 16 and the wall of the container 12 for build-up of gas pressure to rupture the container 12 and to provide a free-flow path for gases therefrom.

The container 12 is enclosed in an inner housing 18 formed by a cylinder 19 having peripheral orifices 20 near one end, an end cap 21 that fits over the other end, and the concave half shell 22 of the outer housing 23. The concave half shell 22 has an annular mounting flange 24 and internal screw threads 25 for engagement with the convex half shell 26. The convex half shell 26 has external threads 27 and peripheral orifices 28. An annular space 29 between the inner housing 18 and the outer housing 23 contains a cooling device 30, and, optionally, a substance 31 for neutralizing the acidity or alkalinity of the gases. The cooling device 30 is formed by annular, spiral wrappings of wire screen and is retained in position between the orifices 20 of the inner housing 18 and those 28 of the outer housing 23 by a flange 32 on the end cap 21 and an annular retaining member 33. The flange 32 and the annular retaining member 33 have perforations 34 to permit the flow of gases through the screen 30. An annular supporting member 35 retains the pH adjusting material 31 in a position adjacent the orifices 20. A preferred material 31 is packaged in a toroidal tube of plastic film and comprises powdered iron sulfate, $Fe_2(SO_4)_3$ or $FeSO_4$.

The squib adapter 8 is retained in the concave shell 22 by a snap ring 36 that fits into a groove 37 of the adapter and into a recess 38 of the half shell 22. The wall of the outer housing 23 is confined between the snap ring 36 and a shoulder 36a on the adapter 8, for retention of the adapter. It is also sealed relative to the half shell 22 by an elastomeric composition 39. An annular, elastomeric, O-ring seal 40 is confined at the juncture of the two half shells 22 and 26 by the retaining member 33 to prevent escape of gases therethrough.

Although the half shell 22 of the outer housing 23 is made concave so that it will fit over parts typically assembled on the steering column of an automobile, this design also provides the environment for another important inventive feature: Because the half shell 22 is concave at its junction with the inner housing cylinder 19, a deep, annular trough 43 is formed. In order to prevent possible failure of the wall of the container 12 over this trough 43, the container wall is drawn by a stamping die into a form that fits into the trough 43 so that it may be directly supported by the sides thereof. While this additional drawing solves the problem of supporting the wall of the container 12 over the trough 43, it may also produce the surprising and valuable result of thinning the wall of the container 12 in the vicinity of the orifices 20 sufficiently to insure prompt rupture of the container 12 through the orifices 20 when the gas generant 10 is ignited. This is a very valuable result, because it may otherwise be necessary to subject the container 12 to expensive, precision machining to insure its prompt rupturability adjacent the orifices 20.

The container 12 is mass produced by conventional machinery used for forming and sealing beverage cans; and, to be reliably handled and formed by such machinery, the starting aluminum sheet stock is about 16.5 mils thick. This thickness, however, is too great to be reliably ruptured with maximum speed by gases produced by the gas generant 10. Hence, it is a very useful result that the wall of the container 12 may be made approximately 5 mils thick in the vicinity of the inner housing orifices 20 by the process of drawing it into a shape that will fit into the trough 43. The 5 mil thickness is optimum both for reliably maintaining strength and the hermetic seal of the container 12, and, at the same time, for reliably rupturing when subjected to the gas pressure produced by the gas generant 10.

An invention has been described that advances the art of safety devices in automotive vehicles. Although the preferred embodiment has been described with considerable specificity regarding detail, it should be noted that such details may be altered without departing from the scope of the invention as it is defined in the following claims.

The invention claimed is:

1. A gas generator comprising:
   ignition means;
   gas generant composition annularly surrounding the ignition means in contact therewith;
   a rupturable, hermetically sealed container enclosing the ignition means and gas generant;
   an inner housing enclosing the container and having peripheral orifices through which the container may be ruptured for expulsion of gases;
   an annular filter inside the container, adjacent the orifices of the inner housing;
   an outer housing surrounding the inner housing, defining an annular chamber therewith, and having peripheral orifices for expulsion of gases into an inflatable structure; and
   cooling means in the annular chamber between the orifices of the inner and outer housings, so that gases produced by the gas generant may pass therethrough.

2. The gas generator of claim 1 wherein the container has an annular wall and the annular filter comprises:
   a plurality of annular wrappings of coarse wire screen (about 8 to 16 mesh) covering the inside surface of the annular wall of the container; and
   a plurality of annular wrappings of fine wire screen (about 30 to 60 mesh) substantially covering the coarse wire screen, whereby the fine screen may remove any solid particles from the gases produced and the corase screen may provide a plenum chamber to promote free flow of gases through the orifices of the inner housing.

3. The gas generator of claim 1 further including a material for neutralizing the pH of the gases produced, the material being positioned in the annular chamber between the orifices of the inner housing and the cooling device.

4. The gas generator of claim 3 wherein said material is powdered iron sulfate.

* * * * *